United States Patent [19]
Glaser et al.

[11] 3,864,023
[45] Feb. 4, 1975

[54] ELECTRO-OPTICAL DISPLAY DEVICE

[75] Inventors: Hans-Joachim Gläser; Günther Graw; Karl-Heinz Makowicki, all of Gelsenkirchen, Germany

[73] Assignee: Flachglas Aktiengesellschaft DELOG-DETAG, Gelsenkirchen, Germany

[22] Filed: Jan. 2, 1974

[21] Appl. No.: 429,897

[30] Foreign Application Priority Data
Jan. 9, 1973 Germany............................ 2300856

[52] U.S. Cl. ........... 350/160 LC, 117/217, 350/150
[51] Int. Cl. ................................................ G02f 1/16
[58] Field of Search ....... 350/160 LC, 150; 117/217

[56] References Cited
UNITED STATES PATENTS
3,600,060   8/1971   Churchill et al.............. 350/160 LC Primary Examiner—Edward S. Bauer
Attorney, Agent, or Firm—Karl F. Ross; Herbert Dubno

[57] ABSTRACT

An electro-optical cell, forming part of a luminous display device, has two light-transmissive walls formed by a pair of parallel transparent or translucent plates and a conductive coating on the inner surface of each plate, at least one of these coatings having discontinuities which form a pattern outlining, for example, an alphanumerical character. Each coating comprises several superposed thin metallic layers, including a layer of a noble metal (e.g. gold) bonded to the plate surface by a bismuth layer. Another bismuth layer may form a protective covering for the exposed side of the noble-metal layer. The space between the plates is filled with a liquid crystal whose light transmissivity is modified by the application of a voltage thereacross.

10 Claims, 3 Drawing Figures

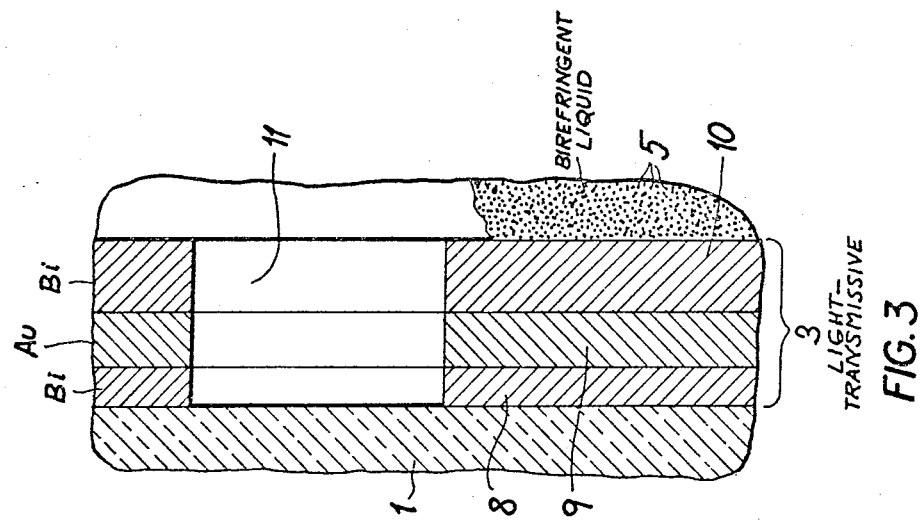
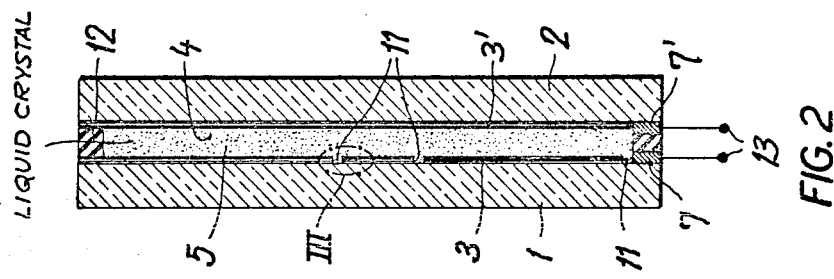
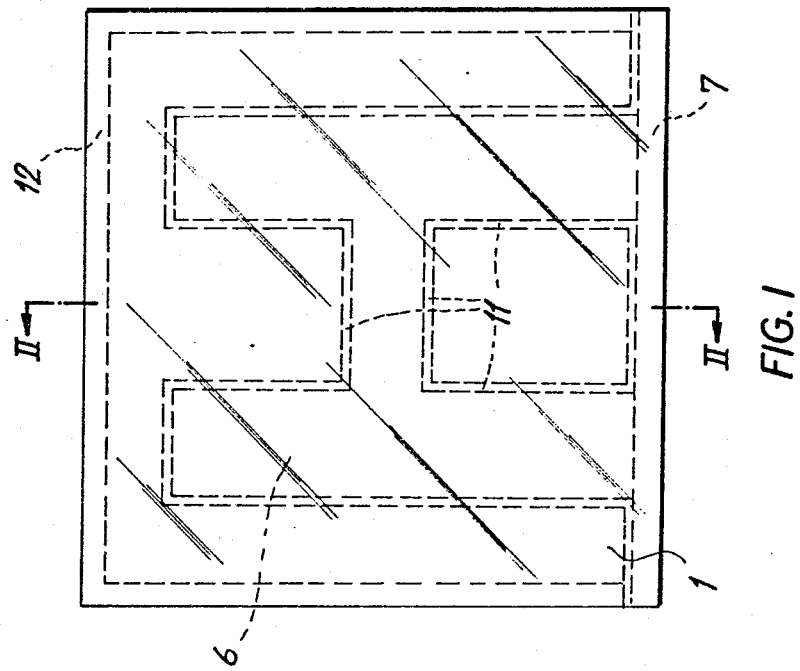

ELECTRO-OPTICAL DISPLAY DEVICE

FIELD OF THE INVENTION

Our present invention relates to a luminous display device of the type in which the variable light transmissivity of a confined liquid in an electro-optical cell, termed a liquid crystal, is utilized for temporarily generating a luminous pattern such as, for example, the outline of an alphanumerical character. Such indicators are frequently used for advertising purposes but have also other fields of application.

BACKGROUND OF THE INVENTION

A nematic liquid of birefringent character in a narrow chamber with one or two light-transmissive (i.e. transparent or translucent) walls can be changed from a normal clear state to a nearly opaque or light-diffusing state by the application of voltage to a pair of electrodes within that chamber. At least one of these coatings, shaped to produce the desired pattern, transmits incident light through the liquid crystal for reflection at the opposite electrode or penetration of the latter electrode to transluminate the cell. These electrodes are generally formed as metallic coatings on the confronting surfaces of a pair of closely spaced carrier plates constituting the major walls of the cell chamber which contains the liquid crystal. Birefringent liquids used for this purpose, such as those based on nitrobenzene, are known to have a corrosive effect upon the metallic layers conventionally employed as the cell electrodes; their reaction with the electrode material, in turn, tends to poison the liquid crystal.

OBJECT OF THE INVENTION

The object of our present invention is to provide a composition adapted to withstand this corrosive action for prolonged periods, thereby extending the service life of an electrofluorescent cell used in such a display device.

SUMMARY OF THE INVENTION

We have found that a long-lasting and relatively inert coating for the purpose set forth can be obtained by laminating such a coating from at least two metallic layers, i.e. a highly conductive layer of a noble metal (preferably gold) and a bonding layer of bismuth inserted between this conductive layer and its supporting wall surface.

According to another feature of our invention, the exposed side of the highly conductive layer is overlain by a protective covering in the form of a futher bismuth layer.

Such a laminate, which may be deposited on the inner wall surface of its carrier plate by cathodic sputtering or some other suitable process known per se, is highly stable in an environment of nitrobenzene, or the like even though the liquid has access to all the layers at the pattern-forming discontinuities of one or both electrodes.

In order to minimize the absorption of radiant energy passing through the cell while insuring satisfactory electrical conduction, we prefer to limit the thickness of each layer of either coating to a range between about 20 and 100 angstroms. Advantageously, the several layers increase progressively in thickness from the supporting wall surface inwardly, with a maximum thickness of about 60 A for the bonding layer, 80 A for the noble-metal layer and 100 A for the protective layer. Excellent results, in terms of long service life under heavy load, have been achieved with bonding layers of about 30 A, gold layers of about 40 A and protective layers of about 60 A.

The relative inertness of our improved conductive coating allows the discontinuities thereof to be produced by simple mechanical engraving after deposition of the laminated layers, the resulting detritus being almost insignificant in quantity and being easily removed (e.g. by blowing) so as not to contaminate the liquid subsequently contacting the electrode. The hitherto frequently employed techniques of screen-printing or photoengraving, which tend to leave residues reacting with the birefringent liquid, can therefore be dispensed with.

BRIEF DESCRIPTION OF THE DRAWING

The above and other features of our invention will now be described with reference to the accompanying drawing in which:

FIG. 1 is a face view of a display device embodying our invention;

FIG. 2 is a cross-sectional view taken on the line II — II of FIG. 1; and

FIG. 3 is an enlarged sectional view of the area III of FIG. 2.

SPECIFIC DESCRIPTION

The device shown in FIGS. 1 – 3 comprises two parallel glass plates 1, 2 provided on their confronting inner surfaces with conductive coatings 3 and 3', respectively. A frame 12 of dielectric material forms with the coated plates 1 and 2 a closed chamber 4 filled with a birefringent liquid 5, e.g. nitrobenzene. Coating 3 has discontinuities 11 which define a characteristic pattern 6, here specifically the outline of a letter H. Two terminal strips 7, 7' in contact with coating 3 and 3' form part of a circuit 13 for applying a selected control voltage across the liquid crystal 5 via the electrodes constituted by these coatings.

As particularly illustrated in FIG. 3 for the discontinuous coating 3, each coating consists of three superposed metallic layers, i.e. a relatively thin bonding layer 8 of bismuth, a somewhat heavier gold layer 9, and a still heavier layer 10 also of bismuth. These layers advantageously have the preferred thicknesses given above, such as 30 A for layer 8, 40 A for layer 9, and 60 A for layer 10.

As best seen in FIG. 3, the discontinuities 11 are straight cuts extending through all three layers to the inner surface of the supporting glass plate 1.

From FIG. 1 it will be noted that the terminal strip 7 is conductively connected to that part of coating 3 which lies within the area 6, defining the letter H to be displayed (directly or by projection upon some remote surface), but that the remainder of the coating is insulated from that strip by the cuts 11 and is therefore de-energized. Only the area H, therefore, will be alternately energized and de-energized by a control voltage intermittently applied to strips 7, 7' from an a-c source.

The transparency of both carrier plates 1, 2 and their associated coatings 3, 3' enables the cell to be transluminated by a nonillustrated light source. If plate 2 were made reflective, e.g. by being "silvered" to act as a mirror, the character could be displayed by episcopic illumination from the side of plate 1.

The transverse dimensions shown in FIG. 2, i.e. the layer thicknesses and the width of the chamber 4, have been greatly exaggerated for the sake of clarity.

We claim:

1. An electro-optical display device comprising:
   wall means forming a closed chamber, said wall means including a light-transmissive plate;
   a pair of electrodes integral with said wall means confronting each other across said chamber, one of said electrodes being a discontinuous light-transmissive coating on an inner surface of said plate forming a pattern to be displayed;
   a liquid crystal in said chamber contacting said electrodes; and
   circuit means for energizing said electrodes;
   said coating consisting of a plurality of superposed metallic layers including a bonding layer of bismuth adhering to said inner surface and a highly conductive layer of noble metal adhering to said bonding layer.

2. A display device as defined in claim 1 wherein said noble metal is gold.

3. A display device as defined in claim 1, further comprising a protective layer of bismuth overlying said highly conductive layer.

4. A display device as defined in claim 3 wherein said protective layer is heavier than said bonding layer.

5. A display device as defined in claim 3 wherein the thickenss of said bonding layer ranges between substantially 20 and 60 A, the thickness of said highly conductive layer ranges between substantially 20 and 80 A and the thickness of said protective layer ranges between substantially 20 and 100 A.

6. A display device as defined in claim 5 wherein said bonding layer, said highly conductive layer and said protective layer are of progressively increasing thickness.

7. A display device as defined in claim 6 wherein said bonding layer has a thickness of substantially 30 A, said highly conductive layer has a thickness of substantially 40 A and said protective layer has a thickness of substantially 60 A.

8. A display device as defined in claim 1 wherein said coating has discontinuities in the form of cuts extending through all layers thereof to said inner surface.

9. A display device as defined in claim 1 wherein said liquid crystal contains nitrobenzene.

10. A display device as defined in claim 1 wherein said wall means comprises a second light-transmissive plate confronting the first-mentioned plate, the other of said electrodes including a second light-transmissive coating on said second plate of substantially the same composition and thickness as the coating on said first-mentioned plate.

* * * * *